US011420189B2

(12) United States Patent
Sawada et al.

(10) Patent No.: US 11,420,189 B2
(45) Date of Patent: Aug. 23, 2022

(54) EXHAUST GAS PURIFICATION CATALYST

(71) Applicant: CATALER CORPORATION, Kakegawa (JP)

(72) Inventors: Kazunari Sawada, Kakegawa (JP); Ryota Onoe, Kakegawa (JP); Tetsuhiro Hirao, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 110 days.

(21) Appl. No.: 16/623,928

(22) PCT Filed: Jun. 7, 2018

(86) PCT No.: PCT/JP2018/021915
§ 371 (c)(1),
(2) Date: Dec. 18, 2019

(87) PCT Pub. No.: WO2019/012874
PCT Pub. Date: Jan. 17, 2019

(65) Prior Publication Data
US 2020/0129963 A1    Apr. 30, 2020

(30) Foreign Application Priority Data
Jul. 11, 2017  (JP) .............................. JP2017-135688

(51) Int. Cl.
*B01J 23/00* (2006.01)
*B01J 23/44* (2006.01)
(Continued)

(52) U.S. Cl.
CPC ............ *B01J 23/63* (2013.01); *B01D 53/944* (2013.01); *B01J 35/0006* (2013.01); *B01J 35/04* (2013.01);
(Continued)

(58) Field of Classification Search
CPC ........ B01J 23/002; B01J 23/44; B01J 23/464; B01J 23/63; B01J 35/04; F01N 3/0222; F01N 3/035; F01N 3/101; F01N 3/2803
See application file for complete search history.

(56) References Cited

U.S. PATENT DOCUMENTS 7,608,561 B2 * 10/2009  Miyoshi ................... B01J 35/04
502/326
7,772,151 B2 *  8/2010  Li ............................. B01J 23/63
502/339
(Continued)

FOREIGN PATENT DOCUMENTS

CN     104981288 A    10/2015
EP       2491999 A1     8/2012
(Continued)

OTHER PUBLICATIONS

Aug. 21, 2018 International Search Report issued in International Patent Application No. PC/JP2018/021915.
(Continued)

*Primary Examiner* — Cam N. Nguyen
(74) *Attorney, Agent, or Firm* — Oliff PLC

(57) ABSTRACT

An exhaust gas purification catalyst having a substrate having a wall flow structure, and a catalyst layer. The catalyst layer has: an A section provided in the interior of the partition wall, along an extension direction X of the partition wall, from an exhaust gas inflow end section; a C section provided in the interior of the partition wall, along the extension direction X of the partition wall, from an exhaust gas outflow end section; and a B section disposed between the A section and the C section in the extension direction X of the partition wall, and provided over the surface of the partition wall on the side in contact with the inlet cell, the
(Continued)

interior of the partition wall, and the surface of the partition wall on the side in contact with the outlet cell.

11 Claims, 7 Drawing Sheets

(51) Int. Cl.
*B01J 23/46* (2006.01)
*B01J 23/63* (2006.01)
*B01J 35/04* (2006.01)
*B01D 53/94* (2006.01)
*F01N 3/022* (2006.01)
*F01N 3/035* (2006.01)
*F01N 3/10* (2006.01)
*F01N 3/28* (2006.01)
*B01J 35/00* (2006.01)

(52) U.S. Cl.
CPC ........... *F01N 3/0222* (2013.01); *F01N 3/035* (2013.01); *F01N 3/101* (2013.01); *F01N 3/2803* (2013.01); *B01D 2255/1023* (2013.01); *B01D 2255/1025* (2013.01); *B01D 2255/9035* (2013.01); *F01N 2370/02* (2013.01); *F01N 2510/0682* (2013.01)

(56) References Cited

U.S. PATENT DOCUMENTS

| | | | | |
|---|---|---|---|---|
| 7,871,452 B2* | 1/2011 | Yamada | ................. | B01J 37/024 55/523 |
| 7,951,338 B2* | 5/2011 | Miyairi | .................... | B01J 35/04 422/177 |
| 8,133,841 B2* | 3/2012 | Noda | ................. | B01D 46/2429 502/439 |
| 8,409,519 B2* | 4/2013 | Watanabe | ................. | B01J 23/58 422/180 |
| 8,789,356 B2* | 7/2014 | Phillips | ................. | B01J 37/0244 60/274 |
| 9,238,982 B2* | 1/2016 | Springer | ................. | F01N 3/035 |
| 9,242,212 B2* | 1/2016 | Phillips | ................. | B01J 35/0006 |
| 9,527,031 B2* | 12/2016 | Chandler | ................. | F01N 3/0222 |
| 9,611,773 B2* | 4/2017 | Brown | ................. | B01J 35/0006 |
| 9,849,443 B2* | 12/2017 | Harada | ................. | B01J 35/1014 |
| 9,890,673 B2* | 2/2018 | Kuki | ................. | B01D 46/247 |
| 9,981,223 B2* | 5/2018 | Tsuji | ................. | B01J 35/04 |
| 10,018,095 B2* | 7/2018 | Nomura | ................. | B01D 53/94 |
| 10,060,312 B2* | 8/2018 | Suzawa | ................. | F01N 3/0222 |
| 10,086,363 B2* | 10/2018 | Onoe | ................. | B01D 46/2429 |
| 10,159,935 B2* | 12/2018 | Onoe | ................. | B01D 53/9468 |
| 10,344,655 B2* | 7/2019 | Onoe | ................. | B01D 53/94 |
| 10,369,555 B2* | 8/2019 | Burgess | ................. | B01J 23/42 |
| 10,500,571 B2* | 12/2019 | Greenham | ......... | B01D 53/9418 |
| 10,688,476 B2* | 6/2020 | Onoe | ................. | B01J 37/0236 |
| 10,807,040 B2* | 10/2020 | Chen | ................. | B01J 23/6482 |
| 10,808,585 B2* | 10/2020 | Chandler | ................. | F01N 3/2066 |
| 10,926,221 B2* | 2/2021 | Chen | ................. | B01D 53/944 |
| 2008/0020922 A1* | 1/2008 | Li | ................. | B01D 53/944 502/73 |
| 2008/0207438 A1 | 8/2008 | Suzuki et al. | | |
| 2009/0246098 A1 | 10/2009 | Endo et al. | | |
| 2011/0094207 A1 | 4/2011 | Woerz et al. | | |
| 2011/0179777 A1* | 7/2011 | Chandler | ................. | F01N 3/0821 60/299 |
| 2015/0375206 A1 | 12/2015 | Aoki | | |
| 2016/0281562 A1 | 9/2016 | Miyairi et al. | | |
| 2016/0288096 A1* | 10/2016 | Fujiwara | ................. | B01D 53/945 |
| 2018/0021726 A1 | 1/2018 | Onoe et al. | | |
| 2018/0021767 A1 | 1/2018 | Onoe et al. | | |

FOREIGN PATENT DOCUMENTS

| | | |
|---|---|---|
| JP | 2012-172597 A | 9/2012 |
| JP | 2015-226907 A | 12/2015 |
| JP | 2016-150305 A | 8/2016 |
| JP | 2016-182536 A | 10/2016 |
| WO | 2007/139113 A1 | 12/2007 |
| WO | 2016/133087 A1 | 8/2016 |
| WO | 2016/160953 A1 | 10/2016 |
| WO | 2016/160988 A1 | 10/2016 |

OTHER PUBLICATIONS

Jun. 8, 2020 Extended European Search Report issued in European Patent Application No. 18831131.0.
Jun. 3, 2020 Indian Office Action issued in Indian Patent Application No. 202027000040.
May 18, 2022 Office Action issued in Chinese Patent Application No. 201880046330.0.

* cited by examiner

EXHAUST GAS PURIFICATION CATALYST

TECHNICAL FIELD

The present invention relates to an exhaust gas purification catalyst. More particularly, the present invention relates to an exhaust gas purification catalyst of wall flow type.

The present application claims priority based on Japanese Patent Application No. 2017-135688, filed on Jul. 11, 2017, the entire contents whereof are incorporated in the present specification by reference.

BACKGROUND ART

Exhaust gas emitted by internal combustion engines such as automobile engines contains harmful components such as hydrocarbons (HC), carbon monoxide (CO), nitrogen oxides ($NO_x$) and particulate matter (PM). Exhaust gas purification catalysts are conventionally used in order to efficiently trap and remove such harmful components from exhaust gas.

Patent Literature 1 is a prior application by the inventors pertaining thereto exhaust gas purification catalysts. Patent Literature 1 discloses an exhaust gas purification catalyst provided with: a substrate having a wall flow structure including an inlet cell in which an exhaust gas inflow end section opens, an outlet cell in which an exhaust gas outflow end section opens, and a porous partition wall that separates the inlet cell from the outlet cell; a first catalyst layer provided in the interior of the partition wall; and a second catalyst layer provided in the interior of the partition wall, wherein the coating amount of the first catalyst layer and the coating amount of the second catalyst layer satisfy a predetermined relationship. The exhaust gas purification catalyst allows effectively bringing out the OSC capacity of an oxygen storage material, while reducing pressure loss.

CITATION LIST

Patent Literature

Patent Literature 1: Japanese Patent Application Publication No. 2016-150305

SUMMARY OF INVENTION

When passing through the partition wall of the exhaust gas purification catalyst, the exhaust gas comes in contact with the catalyst layer, whereupon harmful components are purified. In the above exhaust gas purification catalyst, however, opportunities for contact between the exhaust gas and the catalyst layer are limited to the interior of the partition wall. Studies by the inventors have revealed that, as a result, the capacity of the catalyst layer may in some instances fail to be fully utilized. In the wake of increased environmental awareness and societal inclination towards energy conservation, recent years have witnessed a demand for reductions in harmful components in exhaust gas that go beyond environmental regulatory values.

In view of the above, it is an object of the present invention to provide an exhaust gas purification catalyst boasting superior exhaust gas purification performance.

The present invention provides an exhaust gas catalyst disposed in an exhaust passage of an internal combustion engine, and that purifies exhaust gas emitted by the internal combustion engine. The exhaust gas purification catalyst is provided with a substrate having a wall flow structure including an inlet cell in which an exhaust gas inflow end section opens, an outlet cell in which an exhaust gas outflow end section opens, and a porous partition wall that separates the inlet cell from the outlet cell; and a catalyst layer which is provided in the substrate, and which contains a metal catalyst. The catalyst layer has: an A section provided in the interior of the partition wall, along an extension direction of the partition wall, from the exhaust gas inflow end section; a C section provided in the interior of the partition wall, along the extension direction of the partition wall, from the exhaust gas outflow end section; and a B section disposed between the A section and the C section in the extension direction of the partition wall, the B section being provided over the surface of the partition wall on the side in contact with the inlet cell, the interior of partition wall, and the surface of the partition wall on the side in contact with the outlet cell.

In the exhaust gas purification catalyst, the catalyst layer is provided in the interior of the partition wall, at the A section and the C section, while at the B section, the catalyst layer is provided not only in the interior of the partition wall, but also on the surfaces of the partition wall that are in contact with the inlet cell and the outlet cell. As a result it becomes possible to increase opportunities for contact between the exhaust gas and the catalyst layer, for instance as compared with an exhaust gas purification catalyst having a catalyst layer only in the interior of the partition wall. Specifically, in a case for instance where the exhaust gas moves from the inlet cell towards the outlet cell through a partition wall portion in the vicinity of the exhaust gas inflow end section, firstly the exhaust gas comes into contact with the catalyst layer provided in the interior of the partition wall, at the A section, and then, at the B section, comes into contact with the catalyst layer provided on the partition wall surface that is in contact with the outlet cell. In a case for instance where the exhaust gas moves from the inlet cell towards the outlet cell through a partition wall portion in the vicinity of the exhaust gas outflow end section, firstly the exhaust gas comes into contact with the catalyst layer provided on the partition wall surface that is in contact with the inlet cell, at the B section, and then, at the C section, comes into contact with the catalyst layer provided in the interior of the partition wall. In a case for instance where the exhaust gas moves from the inlet cell towards the outlet cell through a partition wall portion in the B section, firstly the exhaust gas comes into contact with the catalyst layer provided on the partition wall surface that is in contact with the inlet cell, subsequently into contact with the catalyst layer provided in the interior of the partition wall, and then into contact with the catalyst layer provided on the partition wall surface that is in contact with the outlet cell. In the exhaust gas purification catalyst, therefore, the exhaust gas can be purified efficiently by utilizing the catalyst layer effectively, also in a case where the exhaust gas passes through all the partition wall portions.

The feature "catalyst layer provided in the interior of the partition wall" in the A section and the C section signifies that the catalyst layer is present mainly in the interior of the partition wall (catalyst layer present biased towards the interior rather than the surface). More specifically, in an observation for instance of a cross section of the catalyst layer using an electron microscope, the entire amount of the metal catalyst in an area having a length of 10% of the partition wall along the extension direction, from the exhaust gas inflow end section or the exhaust gas outflow end section, is taken as 100 mass %. In this case, the proportion of metal catalyst that is present in the interior of the partition wall is about 50 mass % or higher, typically 80 mass % or higher, for instance 90 mass % or higher, and preferably 95 mass % or higher. This is therefore clearly distinct from an instance where, when attempting to arrange the catalyst layer on the surface of the partition wall, for example part of the catalyst layer erodes unintentionally the interior of the partition wall.

In a preferred embodiment, relative to the total length of the partition wall in the extension direction as 100%, the B section is disposed over a length of 15% to 51% of the total length of the partition wall. As a result it becomes possible to further bring out at least one of enhancement of a warm-up property and reduction of pressure loss.

In a preferred embodiment, relative to the total length of the partition wall in the extension direction as 100%, the A section is disposed over a length of 10% to 40% of the total length of the partition wall. As a result it becomes possible to further bring out at least one of enhancement of the warm-up property and reduction of pressure loss.

In a preferred embodiment, a coating amount on the B section per L of volume of the substrate is 145 g/L or more. As a result it becomes possible to further bring out at least one of enhancing exhaust gas purification performance and enhancing the warm-up property.

In a preferred embodiment, the coating amount on the C section per L of volume of the substrate is larger than the coating amount on the A section per L of volume of the substrate. As a result it becomes possible to increase efficiently the warm-up property and heat retention, throughout the exhaust gas purification catalyst, by controlling the flow of the exhaust gas in the extension direction of the partition wall.

In a preferred embodiment, the coating amount on the C section per L of volume of the substrate is smaller than the coating amount on the A section per L of volume of the substrate. As a result it becomes possible to reduce pressure loss, at a yet higher level.

In a preferred embodiment, the A section contains rhodium. As a result it becomes possible to realize yet higher exhaust gas purification performance at normal times, for instance at low to medium loads.

In a preferred embodiment, the B section contains rhodium, on the surface of the partition wall on the side in contact with the inlet cell. As a result it becomes possible to realize yet higher exhaust gas purification performance at normal times, for instance at low to medium loads.

In a preferred embodiment, the C section contains rhodium. As a result it becomes possible to achieve a yet higher exhaust gas purification performance, at high load.

In a preferred embodiment, the A section contains palladium. As a result it becomes possible to efficiency increase the warm-up property and heat retention throughout the exhaust gas purification catalyst.

In a preferred embodiment, the internal combustion engine is a gasoline engine. The above-described effects can be brought out more efficiently in a case where the internal combustion engine is a gasoline engine.

DESCRIPTION OF EMBODIMENTS

Figure 1:
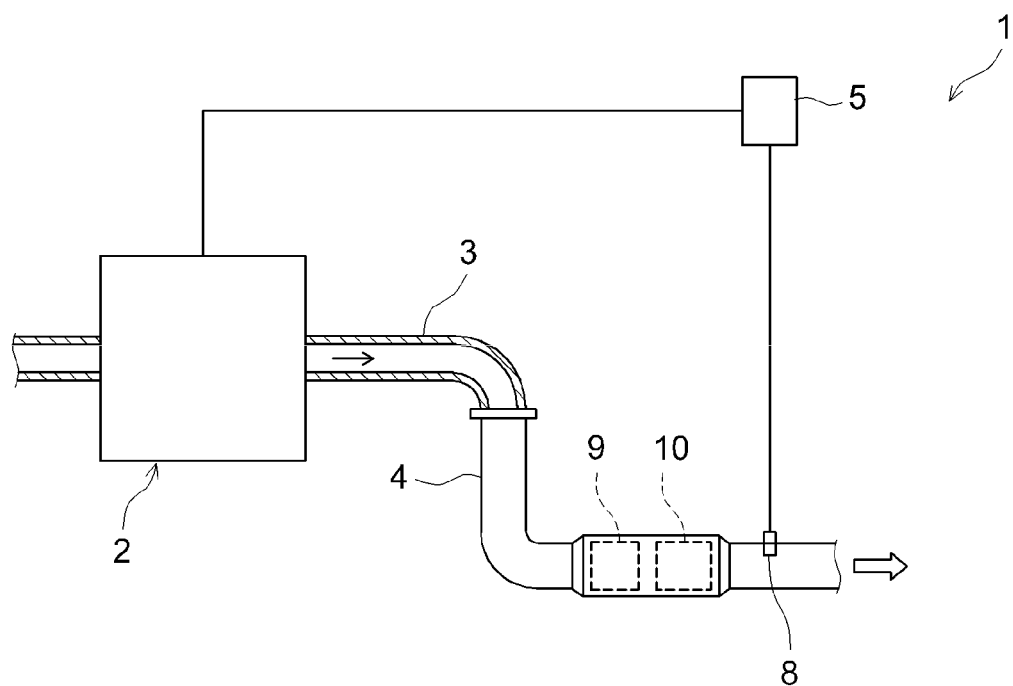
FIG. 1 is a schematic diagram illustrating an exhaust gas purification device according to an embodiment, and peripheral structures thereof.

Preferred embodiments of the present invention will be explained below with reference to accompanying drawings. Any features other than the features specifically set forth in the present specification and which may be necessary for carrying out the present invention can be regarded as instances of design matter, for a person skilled in the art, based on conventional techniques in the technical field in question. The present invention can be realized on the basis of the disclosure of the present specification and common technical knowledge in the relevant technical field. In the drawings below, members and portions that elicit identical effects are denoted with identical reference numerals, and a recurrent explanation thereof will be omitted or simplified. The dimensional relationships (length, width, thickness and so forth) in the figures do not necessarily reflect actual dimensional relationships. In the present specification a numerical value range notated as "A to B" (where A and B are arbitrary numerical values) denotes a value equal to or larger than A and equal to or smaller than B.

FIG. 1 is a schematic diagram illustrating an exhaust gas purification device 1, and peripheral structures thereof. The exhaust gas purification device 1 is provided in the exhaust system of an internal combustion engine (engine) 2. An air-fuel mixture containing oxygen and fuel gas is supplied to the internal combustion engine 2. The air-fuel mixture is burned in the internal combustion engine 2, and the resulting combustion energy is converted to mechanical energy. The burned air-fuel mixture becomes exhaust gas that is discharged to the exhaust system. The internal combustion engine 2 of the present embodiment is configured mainly in the form of a gasoline engine of an automobile. However, the internal combustion engine 2 may be an engine (for instance a diesel engine) other than a gasoline engine.

The exhaust gas purification device 1 purifies harmful components, such as hydrocarbons (HC), carbon monoxide (CO) and nitrogen oxides ($NO_x$), contained in the exhaust gas that is emitted from the internal combustion engine 2, and traps particulate matter (PM) contained in the exhaust gas. The exhaust gas purification device 1 is provided with an exhaust passage that communicates the internal combustion engine 2 with an exhaust system, an engine control unit (ECU) 5, an upstream catalyst 9, and a gasoline particulate filter (GPF) 10. The arrow in the figure denotes the flow direction of the exhaust gas.

The exhaust passage in the present embodiment is made up of an exhaust manifold 3 and an exhaust pipe 4. One end of the exhaust manifold 3 is connected to an exhaust port (not shown) that communicates with the exhaust system of the internal combustion engine 2. The other end of the exhaust manifold 3 is connected to the exhaust pipe 4.

The upstream catalyst 9 and the GPF 10 are disposed halfway the exhaust pipe 4. The GPF 10 is an example of an exhaust gas purification catalyst. The GPF 10 will be explained in detail further on. The configuration of the upstream catalyst 9 may be similar to conventional configurations, and is not particularly limited. The upstream catalyst 9 may be for instance a conventionally known oxidation catalyst (DOC), a three-way catalyst or a $NO_x$ adsorption reduction catalyst (LNT). The upstream catalyst 9 may have for instance a carrier, and a noble metal such as rhodium (Rh), palladium (Pd) or platinum (Pt), supported on the carrier. The upstream catalyst 9 may have for instance a function of raising the temperature of exhaust gas flowing into the GPF 10, during regeneration of the GPF 10. The upstream catalyst 9 need not be necessarily provided, and can be omitted. A downstream catalyst can be further disposed downstream of the GPF 10.

The ECU 5 controls the exhaust gas purification device 1 and the internal combustion engine 2. The configuration of the ECU 5 may be identical to conventional configurations, and is not particularly limited. The ECU 5 may be for instance a digital computer. An input port (not shown) is provided in the ECU 5. The ECU 5 is electrically connected to sensors (for instance a pressure sensor 8) that are installed at various sites in the exhaust gas purification device 1 and the internal combustion engine 2. Information detected by the sensors is transmitted thereby to the ECU 5, in the form of electrical signals, via the input port. An output port (not shown) is also provided in the ECU 5. The ECU 5 transmits control signals via the output port. For instance, the ECU 5 controls startup and stop of the exhaust gas purification device 1 for example depending on the amount of exhaust gas discharged by the internal combustion engine 2.

Figure 2:
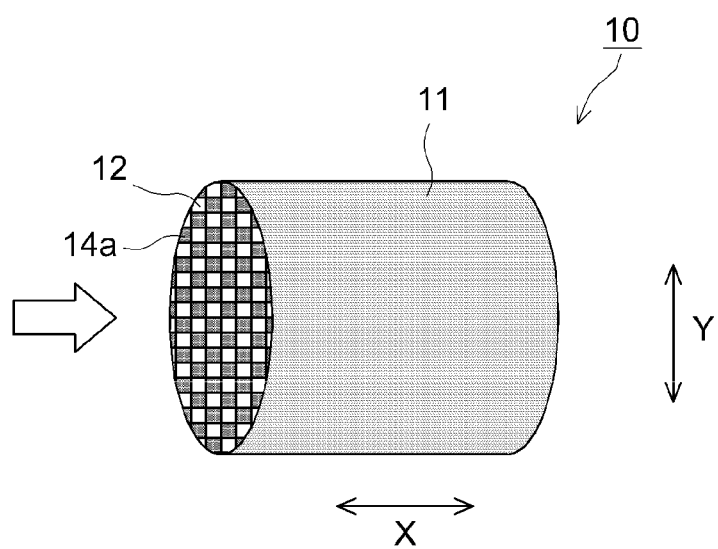
FIG. 2 is a perspective-view diagram illustrating schematically an exhaust gas purification catalyst according to an embodiment.
Figure 3:
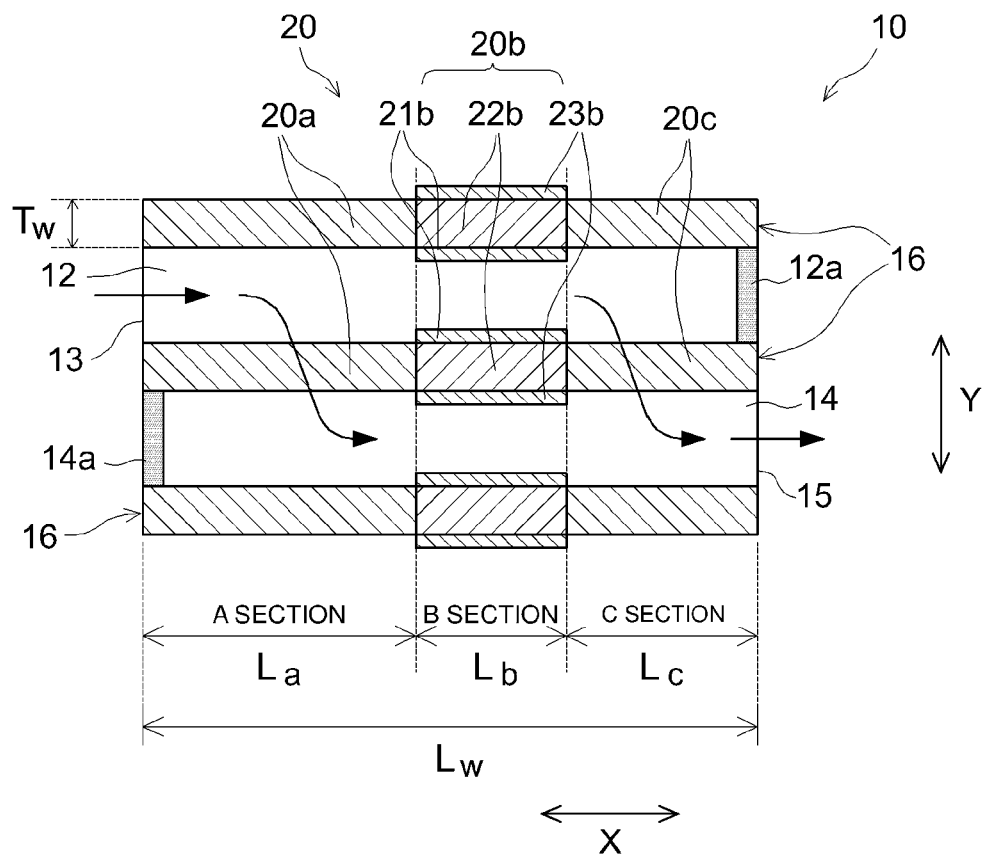
FIG. 3 is a partial cross-sectional diagram illustrating schematically an exhaust gas purification catalyst according to an embodiment.

FIG. 2 is a perspective-view diagram of the GPF 10. FIG. 3 is a partial cross-sectional diagram of an enlargement of part of a cross section resulting from cutting the GPF 10 in the cylinder axis direction. The flow direction of exhaust gas in FIG. 2 and FIG. 3 is depicted with arrows. Specifically, the left side in FIG. 2 and FIG. 3 is the upstream side (front side) of the exhaust pipe 4, and the right side is the downstream side (rear side) of the exhaust pipe 4. The reference symbol X denotes the cylinder axis direction of the GPF 10, in other words, the extension direction of the partition wall 16. The reference symbol Y denotes the thickness direction of the partition wall 16, being a direction perpendicular to that of the reference symbol X. These reference symbols are merely directions for convenience of explanation, and are not meant to limit in any way the manner in which the GPF 10 is installed. The GPF 10 has the function of purifying harmful components contained in the exhaust gas, and trapping particulate matter (PM) contained in the exhaust gas. The GPF 10 is provided with a substrate 11 having a wall flow structure, and a catalyst layer 20.

The substrate 11 makes up the framework of the GPF 10. The substrate 11 is a honeycomb structure. As the substrate 11, conventional substrates of various materials and forms that are used in this kind of applications can be used. For instance, a substrate made up of a highly heat-resistant material typified by ceramics such as cordierite, aluminum titanate, silicon carbide (SiC) and the like, and alloys such as stainless steel, can be used herein. In the present embodiment the overall outer shape of the substrate 11 is a cylinder. However, the overall outer shape of the substrate 11 is not particularly limited, and an elliptic cylinder shape or polygonal cylinder shape may also be adopted.

The substrate 11 has an inlet cell 12 in which an exhaust gas inflow end section 13 opens, an outlet cell 14 in which an exhaust gas outflow end section 15 opens, and a partition wall 16 that separates the inlet cell 12 from the outlet cell 14. The shape of the inlet cell 12 and of the outlet cell 14 is not particularly limited. For instance, the inlet cell 12 and the outlet cell 14 may adopt various geometrical shapes, such as a rectangular shape encompassing squares, parallelograms, rectangles and trapezoids, and also triangular and other polygonal shapes (for instance, hexagons and octagons), as well as circular shapes. A sealing section 12a is disposed at the exhaust gas outflow end section of the inlet cell 12, the exhaust gas outflow end section being plugged by the sealing section 12a. A sealing section 14a is disposed at the exhaust gas inflow end section of the outlet cell 14, the exhaust gas inflow end section being plugged by the sealing section 14a.

The inlet cell 12 and the outlet cell 14 are partitioned by the partition wall 16. The partition wall 16 has a porous structure that allows exhaust gas to pass therethrough. The porosity of the partition wall 16 is not particularly limited, but may be about 20 to 70 vol %, for example 50 to 60 vol %, for instance from the viewpoint of reducing pressure loss. The average pore size of the partition wall 16 is not particularly limited, but may be about 5 to 30 µm and for example 10 to 20 µm, for instance from the viewpoint of reducing pressure loss. The partition wall 16 extends in the cylinder axis direction of the GPF 10, i.e. in the X direction. The thickness of the partition wall 16, i.e. a length $T_w$ in the Y direction, is not particularly limited, but may be for instance about 1 to 30 mils (where 1 mil is about 25.4 µm), for example from the viewpoint of reducing pressure loss.

The catalyst layer 20 is provided in the substrate 11. Specifically, the catalyst layer 20 is provided on the surface and in the interior of the partition wall 16 of the substrate 11. The catalyst layer 20 contains a metal catalyst. The metal catalyst is for instance a reaction catalyst for purifying (abating) harmful components in the exhaust gas, and burning off/removing PM trapped in the catalyst layer 20. As the metal catalyst, various metal species capable of functioning as an oxidation catalyst and/or reduction catalyst can be appropriately used. For instance, a noble metal of the platinum group such as rhodium, palladium or platinum, can be suitably used herein. Alternatively, ruthenium (Ru), osmium (Os), iridium (Ir), silver (Ag) or gold (Au) can be also used.

The metal catalyst is typically supported on a carrier. Carriers of various materials conventionally utilized in this kind of applications can be used herein as the carrier. For instance, a metal oxide such as alumina ($Al_2O_3$), ceria (CeO$_2$), zirconia (ZrO$_2$), silica (SiO$_2$), titania (TiO$_2$), and solid solutions of the foregoing, such as a ZC (ZrO$_2$—CeO$_2$) complex oxide, can be suitably used. Preferred among the foregoing is a carrier made up of alumina and/or a ZC complex oxide.

The catalyst layer 20 may contain as appropriate optional components, besides the metal catalyst and the carrier on which the metal catalyst is supported. Examples of such optional components include a co-catalyst on which a metal catalyst is not supported, an OSC (oxygen storage capacity) material having oxygen storage capacity, a NO$_x$ adsorbent having NO$_x$ storage capacity, and a stabilizer. Examples of the co-catalyst include alumina and silica. Examples of the OSC material include ceria and complex oxides containing ceria, for instance a ZC complex oxide. Examples of stabilizers include rare earth elements such as lanthanum (La) and yttrium (Y), alkaline earth elements such as calcium (Ca) and barium (Ba), and transition metal elements. These elements are typically present in the form of oxides, in the catalyst layer 20.

The length of the catalyst layer 20 in the X direction is not particularly limited, and the catalyst layer 20 is preferably provided, in the interior of the partition wall 16, over a length identical to the total length $L_w$ of the partition wall 16 in the X direction. As a result it becomes possible to better suppress emission of unpurified exhaust gas derived from slippage thereof at the portion at which the catalyst layer 20 is not disposed. The catalyst layer 20 is divided into three sections, namely A section 20a, B section 20b and C section 20c, along the X direction in which the partition wall 16 extends. The A section 20a is the region closest to the exhaust gas inflow end section 13 among the three sections. Further, the C section 20c is the region closest to the exhaust gas outflow end section 15 among the three sections. The B section 20b is a region between the A section 20a and the C section 20c. Each of these sections of the catalyst layer 20 will be explained next.

The A section 20a is not provided on the surface of the partition wall 16 that is in contact with the inlet cell 12, or on the surface of the partition wall 16 that is in contact with the outlet cell 14 (instances are however permissible where part of the catalyst layer 20 unintentionally remains on the surface of the partition wall 16). In other words, in the A section 20a the proportion of the metal catalyst present in the interior of the partition wall 16 is typically about 50 mass % or higher, typically 80 mass % or higher, for instance 90 mass % or higher, and preferably 95 mass % or higher. The A section 20a is provided only in the interior of the partition wall 16.

The A section 20a extends in the X direction from the exhaust gas inflow end section 13. One end of the A section 20a in the X direction is in contact with the exhaust gas inflow end section 13. The length $L_a$ of the A section 20a in the X direction is not particularly limited, but, when the total length of the partition wall 16 in the X direction is denoted by $L_w$, the length $L_a$ may be about 1% or more of $L_w$, preferably 5% or more, and more preferably 10% or more. The effect of the art disclosed herein can be better brought out as a result. Further, $L_a$ may be about 66% (2/3) or less of $L_w$, preferably 50% (1/2) or less, and more preferably 40% or less. An active purification reaction occurs as a result, and reaction heat is generated, in the A section 20a, i.e. the upstream side of the GPF 10. A warm-up property and heat retention of the GPF 10 can be enhanced by virtue of the fact that this reaction heat is transmitted to the entirety of the GPF 10 with the flow of exhaust gas. For instance in green vehicles equipped with an energy-saving mechanism, superior catalytic activity can therefore be brought out stably also in embodiments in which the temperature of exhaust gas becomes unstable accompanying startup or stopping of the engine, or where the temperature of the exhaust gas drops temporarily below a catalytic activity temperature.

The thickness of the A section 20a, i.e. the length thereof in the Y direction, is not particularly limited, but, when the overall thickness of the partition wall 16 is denoted by $T_w$, the thickness is about 50% or more of $T_w$, preferably 80% or more, and more preferably 90% or more. In particular, the thickness of the A section 20a may be identical to the overall thickness $T_w$ of the partition wall 16. In other words, the A section 20a may be in contact with the inlet cell 12 and the outlet cell 14. As a result, opportunities for contact between the exhaust gas and the metal catalyst can be better increased, which allows better enhancing exhaust gas purification performance.

The coating amount on the A section 20a is not particularly limited, but may be about 20 g/L or more, preferably 30 g/L or more, more preferably 45 g/L or more, and for instance 70 g/L or more, per L of volume of the substrate 11 (total bulk volume including cell volume). Exhaust gas purification performance can be better enhanced as a result. The coating amount on the A section 20a may be about 200 g/L or less, preferably 120 g/L or less and more preferably 100 g/L or less, per L of volume of the substrate 11. As a result, a high level of balance between enhancement of exhaust gas purification performance and reduction of pressure loss can be achieved.

The type of the metal catalyst contained in the A section 20a is not particularly limited, and metal catalysts among those exemplified above can be used herein as appropriate. In a preferred embodiment, the A section 20a contains rhodium (Rh), which has high reducing activity. It becomes therefore possible to realize high exhaust gas purification performance at normal times, for instance at low to medium loads. In another preferred embodiment, the A section 20a contains palladium (Pd), which has high oxidation activity. As a result, an active purification reaction can be elicited in the A section 20a, and for instance in green vehicles equipped with an energy-saving mechanism, superior catalytic activity can be brought out stably also in embodiments in which the temperature of the exhaust gas becomes unstable accompanying startup or stopping of the engine, or where the temperature of the exhaust gas drops temporarily below the catalytic activity temperature.

Similarly to the A section 20a, the C section 20c is not provided on the surface of the partition wall 16 that is in contact with the inlet cell 12 or on the surface of the partition wall 16 in contact with the outlet cell 14 (instances are however permissible where part of the catalyst layer 20 may remain unintentionally on the surface of the partition wall 16). In other words, in the C section 20c the proportion of the metal catalyst present in the interior of the partition wall 16 is typically about 50 mass % or higher, typically 80 mass % or higher, for instance 90 mass % or higher, and preferably 95 mass % or higher. Herein the C section 20c is provided only in the interior of the partition wall 16.

The C section 20c extends in the X direction from the exhaust gas outflow end section 15. One end of the C section 20c in the X direction is in contact with the exhaust gas outflow end section 15. The length $L_c$ of the C section 20c in the X direction is not particularly limited, but, when the total length of the partition wall 16 in the X direction is denoted by $L_w$, the length $L_c$ may be about 1% or more of $L_w$, preferably 10% or more, and more preferably 28% or more. As a result, a high level of balance between enhancement of exhaust gas purification performance and reduction of pressure loss can be achieved. Further, $L_c$ may be about 73% (¾) or less of $L_w$, preferably 66% (⅔) or less, and more preferably 61% or less. The effect of the art disclosed herein can be better brought out as a result. Preferably, $L_c$ and $L_a$ satisfy $L_c$ $L_a$, from the viewpoint of better enhancing the warm-up property and heat retention. Further, $L_c$ and $L_a$ preferably satisfy $L_c$ $L_a$, from the viewpoint of better reducing pressure loss.

The thickness of the C section 20c, i.e. the length in the Y direction, is not particularly limited, but, when the overall thickness of the partition wall 16 is denoted by $T_w$, the thickness is about 50% or more of $T_w$, preferably 80% or more, and more preferably 90% or more. In particular, the thickness of the C section 20c may be identical to the overall thickness $T_w$ of the partition wall 16. In other words, the C section 20c may be in contact with the inlet cell 12 and the outlet cell 14. As a result, opportunities for contact between the exhaust gas and the metal catalyst can be better increased, which allows better enhancing exhaust gas purification performance. In a preferred embodiment, the thickness of the C section 20c is identical to the thickness of the A section 20a (while allowing for manufacturing error). As a result it becomes possible to better homogenize the amount of exhaust gas flowing into the partition wall 16 also in the X direction. Therefore, the exhaust gas purification performance can be enhanced to a yet higher level by effectively utilizing the entirety of the catalyst layer 20.

The coating amount on the C section 20c is not particularly limited. In a preferred embodiment, the coating amount on the C section 20c is larger than the coating amount on the A section 20a, from the viewpoint of enhancing the warm-up property and heat retention. The coating amount on the C section 20c per L of the volume of the substrate 11 (total bulk volume including cell volume) may be about 30 g/L or more, preferably 50 g/L or more and more preferably 70 g/L or more. The warm-up property and heat retention can be better enhanced as a result. In another preferred embodiment, the coating amount on the C section 20c is smaller than the coating amount on the A section 20a, from the viewpoint of reducing pressure loss. The coating amount on the C section 20c may be about 200 g/L or less, preferably 140 g/L or less, more preferably 120 g/L or less, and for instance 100 g/L or less, per L of volume of the substrate 11. As a result, a high level of balance between enhancement of exhaust gas purification performance and reduction of pressure loss can be achieved.

The type of the metal catalyst contained in the C section 20c is not particularly limited, and metal catalysts among those exemplified above can be used herein as appropriate. The metal catalyst in the C section 20c may contain the same metal species as that of the metal catalyst of the A section 20a, or may contain different metal species. In a preferred embodiment, the C section 20c contains a metal species different from that of the A section 20a. For instance, one of the C section 20c and the A section 20a contains a metal species having a high reducing activity (e.g., rhodium), and the other contains a metal species having a high oxidation activity (e.g., at least one of palladium and platinum). As a result it becomes possible to efficiently purify, all at a time, harmful components in the exhaust gas. In another preferred embodiment, the C section 20c contains rhodium (Rh) having high reducing activity. This allows bringing out as a result high exhaust gas purification performance, in particular at times of high load. For instance, $NO_x$ in exhaust gas can be purified satisfactorily.

The B section 20b has three layers, namely a first layer 21b, a second layer 22b and a third layer 23b. The first layer 21b, the second layer 22b and the third layer 23b are laid in the Y direction. The first layer 21b is provided on the surface of the partition wall 16 that is in contact with the inlet cell 12. The first layer 21b is spaced from the exhaust gas inflow end section 13 and from the sealing section 12a, in the X direction. The second layer 22b is provided in the interior of the partition wall 16. The third layer 23b is provided on the surface of the partition wall 16 that is in contact with the outlet cell 14. The third layer 23b is spaced from the exhaust gas outflow end section 15 and from the sealing section 14a, in the X direction.

The B section 20b extends in the X direction, between the A section 20a and the C section 20c. One end of the B section 20b is in contact with the A section 20a and the other end is in contact with the C section 20c, in the X direction. The position of the beginning of the B section (i.e. the end section thereof on the side closer to the A section 20a) is not particularly limited, but preferably the beginning of the B section may be disposed at a position about 5% or more of $L_w$, preferably 10% or more, and about 50% or less, preferably 40% or less, from the exhaust gas inflow end section 13, $L_w$ being the total length of the partition wall 16 in the X direction. As a result, a higher level of balance between enhancement of heat retention and the warm-up property, and reduction of pressure loss can be achieved.

The length $L_b$ of the B section 20b in the X direction is not particularly limited, but, when the total length of the partition wall 16 in the X direction is denoted by $L_w$, the length $L_b$ may be about 1% or more of $L_w$, typically 10% or more, preferably 15% or more, and more preferably 21% or more. As a result, a high level of balance between enhancement of heat retention and the warm-up property, and reduction of pressure loss can be achieved. Further, $L_b$ may be about 73% (¾) or less, typically 66% (⅔) or less, preferably 56% or less, and more preferably 51% or less, of $L_w$. The effect of the art disclosed herein can be better brought out as a result.

Preferably $L_c \leq L_a + L_b$ is satisfied, from the viewpoint of better enhancing the warm-up property and heat retention. Further, preferably $L_c \geq L_a + L_b$ is satisfied, from the viewpoint of better reducing pressure loss. In another preferred embodiment, $L_b + L_c$ is about 40% or more, preferably 60% or more, and about 90% or less, of $L_w$. The effect of the art disclosed herein can be better brought out as a result.

The thickness of the second layer 22b provided in the interior of the partition wall 16, i.e. the length of the second layer 22b in the Y direction, is not particularly limited, but, when the overall thickness of the partition wall 16 is denoted by $T_w$, similarly to the A section 20a and the C section 20c, the thickness is about 50% or more of $T_w$, preferably 80% or more, and more preferably 90% or more. In particular, the thickness of the second layer 22b may be identical to the overall thickness $T_w$ of the partition wall 16. As a result, opportunities for contact between the exhaust gas and the metal catalyst can be better increased, which allows better enhancing exhaust gas purification performance. The thickness of the second layer 22b may be identical to the thickness of the A section 20a and the thickness of the C section 20c (while allowing for manufacturing error). The thickness of the first layer 21b and the thickness of the third layer 23b provided on the surface of the partition wall 16 are typically identical (while allowing for manufacturing error). The thickness of the first layer 21b and the thickness of the third layer 23b are typically smaller than the thickness of the second layer 22b.

The coating amount on the B section 20b is typically represented by the sum of the coating amount on the A section 20a and the coating amount on the C section 20c. The coating amount on the B section 20b is not particularly limited, but may be about 100 g/L or more, preferably 145 g/L or more, for instance 165 g/L or more, per L of the volume of the substrate 11 (total bulk volume including cell volume). The exhaust gas purification performance and warm-up property can be better enhanced as a result. The coating amount on the B section 20b may be about 250 g/L or less, preferably 235 g/L or less and for instance 215 g/L or less, per L of volume of the substrate 11. As a result, a high level of balance between enhancement of exhaust gas purification performance and reduction of pressure loss can be achieved. The coating amount of the first layer 21b and the coating amount of the third layer 23b are typically identical. From the viewpoint of better enhancing the warm-up property and heat retention the following relationship is preferably satisfied: coating amount of the first layer 21b=coating amount of the third layer 23b≤coating amount of the second layer 22b.

The type of the metal catalyst contained in the B section 20b is not particularly limited, and metal catalysts among those exemplified above can be used herein as appropriate. The first layer 21b, the second layer 22b and the third layer 23b may contain the same metal species, or may contain different metal species. Typically, the first layer 21b and the third layer 23b contain the same metal species. The first layer 21b and the third layer 23b contain a metal species different from that of the second layer 22b. For instance, the second layer 22b does not contain a metal species identical to that of the first layer 21b and the third layer 23b. The second layer 22b contains a metal species different from at least one of the A section 20a and the C section 20c. It becomes as a result possible to suppress growth (sintering) of the metal, and achieve a GPF 10 of high durability. In a preferred embodiment, the first layer 21b contains rhodium (Rh) having high reducing activity. As a result it becomes possible to realize high exhaust gas purification performance at normal times, for instance at low to medium loads.

The GPF 10 can be produced in accordance with a method similar to conventional methods. In a specific example, a substrate 11 such as that illustrated in FIG. 2 is firstly provided. Next, two types of slurries for catalyst layer formation are prepared, namely a first slurry and a second slurry. The slurries for catalyst layer formation each contain, as an essential component, respective metal catalysts (typically, a solution containing a metal catalyst in the form of ions) that are mutually different between the slurries, and can also contain other optional components, for instance a carrier, a co-catalyst, an OSC material, a binder, and various additives. The properties of the slurry (viscosity, solids content and so forth) may be adjusted as appropriate for instance depending on the size of the substrate 11 that is used, the porosity of the partition wall 16 and the desired properties of the catalyst layer 20. The second slurry may be prepared so as to penetrate into the pores of the partition wall 16 less readily than the first slurry. As an example, the average particle size of the carrier may be set so to obey first slurry<second slurry. As another example, the viscosity of the slurry may be set to obey first slurry<second slurry.

Next, the prepared first slurry is caused to flow into the inlet cell 12 from the exhaust gas inflow end section 13 of the substrate 11, to be supplied into the inlet cell 12 up to a length $(L_a+L_b)$ along the X direction. Suction applied from the side of the outlet cell 14 gives rise to a first pressure difference between the inlet cell 12 and an outlet cell 14. As a result the first slurry is caused to spread within the pores of the partition wall 16, over a range of length $(L_a+L_b)$. The substrate 11 having the first slurry applied thereonto is then dried and fired at a predetermined temperature and for a predetermined time. Herein a suction method is resorted to as the supply method of the slurry, but the supply method is not limited thereto, and may be for instance a pressure method or an immersion method. The drying and firing methods may likewise be similar to those resorted to in the formation of conventional catalyst layers. As a result it becomes possible to form simultaneously the A section 20a of length $L_a$ in the X direction and the second layer 22b of length $L_b$ in the X direction, in the interior of the partition wall 16.

Next, suction is applied from the side of the inlet cell 12, to thereby generate a second pressure difference between the inlet cell 12 and the outlet cell 14. The second pressure difference may be smaller than the first pressure difference. In this state, the prepared second slurry is caused to flow into the outlet cell 14 from the exhaust gas outflow end section 15 of the substrate 11. In the state of having been suctioned from the side of the inlet cell 12, the second slurry is supplied to the outlet cell 14, whereby the second slurry advances in the X direction, through the pores of the partition wall 16, from the side of the exhaust gas outflow end section 15. As a result the second slurry is caused to spread within the pores of the partition wall 16, over a range of length $L_c$. The second slurry further advances straight in the X direction through the pores of the partition wall 16, and eventually reaches the portion at which the second layer 22b is formed. At the portion of the second layer 22b, however, the first slurry has already spread into the pores of the partition walls 16, and the pore size becomes accordingly smaller. As a result, it is difficult for the second slurry to get into the pores of the partition wall 16, and thus the second slurry becomes deposited outside the partition wall 16, across the formed second layer 22b. The substrate 11 having the second slurry applied thereonto is then dried and fired once more, at a predetermined temperature and for a predetermined time. The C section 20c of length $L_c$ in the X direction can be formed as a result in the interior of the partition wall 16. The first layer 21b and the third layer 23b can be formed, respectively, on the surface of the second layer 22b, on the side of the inlet cell 12, i.e. on the surface of the partition wall 16 that is in contact with the inlet cell 12, and on the surface of the second layer 22b on the side of the outlet cell 14, i.e. on the surface of the partition wall 16 that is in contact with the outlet cell 14.

In the GPF 10 having the above configuration the exhaust gas emitted by the internal combustion engine 2 flows into the inlet cell 12, from the end section 13 opened on the exhaust gas inflow side. The exhaust gas having flowed into the inlet cell 12 passes through the partition wall 16 of porous structure, and reaches the outlet cell 14. The catalyst layer 20 is provided in the interior of and on the surface of the partition wall 16. Harmful components in the exhaust gas are purified efficiently as the exhaust gas passes through the catalyst layer 20. The exhaust gas having reached the outlet cell 14 is discharged, out of the GPF 10 from the exhaust gas outflow end section 15, in a state of having had harmful components removed therefrom.

In a more detailed explanation of the above, at normal times (at low load to medium loads) gas permeability drops at the partition wall 16 portion of the B section 20b, and exhaust gas does not flow readily. In other words, the exhaust gas flowing into the inlet cell 12 flows preferentially through a portion of the partition wall 16 closer to the exhaust gas inflow end section 13 than the B section 20b, and through a portion of the partition wall 16 closer to the exhaust gas outflow end section 15 than the B section 20b. In a case for instance where the exhaust gas passes through the portion of the partition wall 16 close to the exhaust gas inflow end section 13, firstly the exhaust gas comes into contact with the catalyst layer in the interior of the partition wall 16, at the A section 20a provided in the interior of the partition wall 16, and then comes into contact with the catalyst layer 23b provided on the surface of the partition wall 16 that is in contact with the outlet cell 14, at the B section 20b. In the case for instance where exhaust gas passes through the portion of the partition wall 16 close to the exhaust gas outflow end section 15, firstly the exhaust gas comes into contact with the catalyst layer 21b provided on the surface of the partition wall 16 that is in contact with the inlet cell 12, at the B section 20b, and next comes into contact with the catalyst layer in the interior of the partition wall 16, at the C section 20c. It is found that at high load, the exhaust gas flows also through the portion of the partition wall 16 of the B section 20b. However, In a case where the exhaust gas passes through the portion of the partition wall 16 at the B section 20b, the exhaust gas comes into contact with the catalyst layer in the sequence: catalyst layer 21b on the surface of the partition wall 16 in contact with an inlet cell 12, at the B section 20b; the catalyst layer 22b provided in the interior of the partition wall 16; and the catalyst layer 23b provided on the surface of the partition wall 16 that is in contact with the outlet cell 14. The GPF 10 allows thus the catalyst layer to be utilized effectively, and the exhaust gas to be purified efficiently, also in a case where the exhaust gas passes through all portions of the partition wall 16.

The GPF 10 disclosed herein can be suitably used in various internal combustion engines, for instance gasoline engines and diesel engines of automobiles. In a preferred embodiment, the GPF 10 exhibits superior low-temperature activity, i.e. warm-up property and heat retention. Green vehicles equipped with hybrid engines or energy-saving mechanisms such as idling stopping have become popular in recent years in the wake of increased environmental awareness and societal inclination towards energy conservation. In green vehicles equipped with such energy-saving mechanisms, the engine frequently starts and stops during operation or during temporary stops, such as when waiting at traffic lights. As a result, the temperature of exhaust gas may become unstable accompanying start and stop of the engine, or the temperature of the exhaust gas may temporarily fall below the catalytic activity temperature. The GPF 10 having superior low-temperature activity can be used particularly preferably in such green vehicles.

Test examples according to the present invention will be explained next, but the invention is not meant to be limited to the test examples below.

Test Example (1)-1: Assessment of Arrangement of Catalyst Layer

Figure 4:
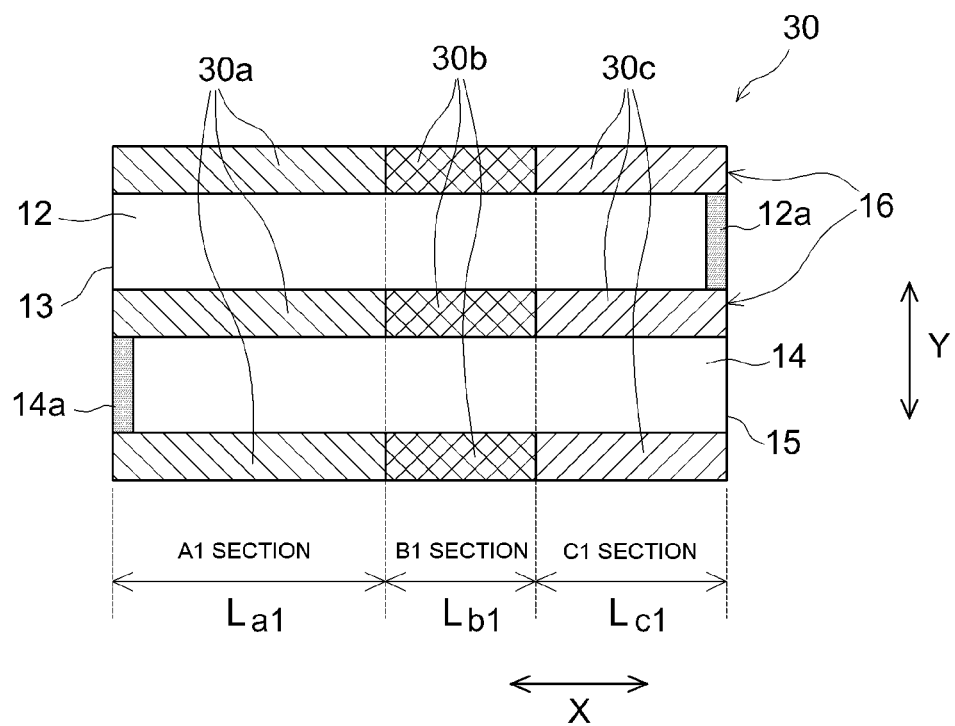
FIG. 4 is a partial cross-sectional diagram illustrating schematically an exhaust gas purification catalyst according to Comparative example 1.

An exhaust gas purification catalyst 30 having a configuration such as that illustrated in FIG. 4 was produced, as Comparative example 1. Specifically, an exhaust gas purification catalyst 30 provided with a catalyst layer only in the interior of the partition wall, at an A1 section, a B1 section and a C1 section, was produced. Specifically, the substrate 11 of wall flow type such as that illustrated in FIG. 2 (made of cordierite; volume: 1.3 L) was firstly provided. An Rh slurry was prepared next by mixing rhodium nitrate (Rh $(NO_3)_3$), an alumina powder ($\gamma$-$Al_2O_3$), a ZC complex oxide ($ZrO_2$—$CeO_2$) powder, barium sulfate ($BaSO_4$), and an $Al_2O_3$-based binder, in ion-exchanged water. Further, a Pd slurry was prepared by mixing palladium nitrate (Pd $(NO_3)_2$), an alumina powder, a ZC complex oxide powder, barium sulfate ($BaSO_4$), and an $Al_2O_3$-based binder, in ion-exchanged water.

Next, the prepared Rh slurry was caused to flow into the inlet cell 12 from the exhaust gas inflow end section 13 of the substrate 11, to be supplied to a portion corresponding to 70% of the total length of the partition wall 16 along the X direction, and thereby coat, with the slurry, the interior of the partition wall 16. The coating amount of the Rh slurry per volume of the substrate 11 was set to 90 g/L. Next, the prepared Pd slurry was caused to flow into the outlet cell 14 from the exhaust gas outflow end section 15 of the substrate 11, to be supplied to a portion corresponding to 55% of the total length of the partition wall 16 along the X direction, and thereby coat, with the slurry, the interior of the partition wall 16. The coating amount of the Pd slurry per volume of the substrate 11 was set to 55 g/L. The Rh slurry and the Pd slurry are mixed with each other in the interior of the partition wall 16, over a length of 25% the total length of the partition wall 16, at a middle portion in the X direction. In this state, the substrate 11 was dried and fired. As a result, the exhaust gas purification catalyst 30 was produced, the exhaust gas purification catalyst 30 being provided with a catalyst layer made up of an A1 section 30a (coating amount 90 g/L) having a coating width $L_{a1}$ in the X direction that is 45% of the total length of the partition wall 16, a B1 section 30b (coating amount 145 g/L) having a coating width $L_{b1}$ in the X direction that is 25% of the total length of the partition wall 16, and a C1 section 30c (coating amount 55 g/L) having a coating width $L_{c1}$ in the X direction that is 30% of the total length of the partition wall 16.

An exhaust gas purification catalyst having a configuration such as that illustrated in FIG. 3 was produced, as Example 1. Specifically, an exhaust gas purification catalyst was produced, the exhaust gas purification catalyst having a catalyst layer provided only in the interior of the partition wall, at the A section and C section, and having a catalyst layer in the interior and on the surface of the partition wall, at the B section. Specifically, firstly a Rh slurry and a Pd slurry were prepared according to Comparative example 1. Next, similarly to Comparative example 1, the prepared Rh slurry was caused to flow into in from the exhaust gas inflow end section 13, to be supplied to a portion corresponding to 70% of the total length of the partition wall 16, along the X direction, and thereby coat, with the slurry, the interior of the partition wall 16, followed by drying and firing. The A section 20a and the second layer 22b were formed as a result in the interior of the partition wall 16. Next, the prepared Pd slurry was caused to flow in from the exhaust gas outflow end section 15, to be supplied to a portion corresponding to 55% of the total length of the partition wall 16, along the X direction, and thereby coat, with the slurry, the interior and the surface of the partition wall 16, followed by drying and firing. The Pd slurry is deposited on the surface of the wall surface of the partition wall 16, over a length of 25% of the total length of the partition wall 16, at a middle portion in the X direction. As a result, an exhaust gas purification catalyst was produced, the exhaust gas purification catalyst having the B section 20b made up of the first layer 21b provided on the surface of the partition wall 16 that is in contact with the inlet cell 12, the second layer 22b provided in the interior of the partition wall 16, and the third layer 23b provided on the surface of the partition wall 16 that is in contact with the outlet cell 14. The specifications of the catalyst layers of Comparative example 1 and Example 1 are summarized in Table 1.

TABLE 1

Test example (1)-1

| Catalyst layer specifications | A section, A1 section | | | B section, B1 section | | | C section, C1 section | | |
|---|---|---|---|---|---|---|---|---|---|
| | Coating width $L_a$ (%) | Arrangement | Catalyst metal | Coating width $L_b$ (%) | Arrangement | Catalyst metal | Coating width $L_c$ (%) | Arrangement | Catalyst metal |
| Comparative example 1 | 45% | Interior | Rh | 25% | Interior | Rh + Pd | 30% | Interior | Pd |
| Example 1 | 45% | Interior | Rh | 25% | Inlet surface | Pd | 30% | Interior | Pd |
| | | | | 25% | Interior | Rh | | | |
| | | | | 25% | Outlet surface | Pd | | | |

(Accelerated Endurance Test)

An accelerated endurance test corresponding to 160,000 km was carried out on the exhaust gas purification catalyst of each example. Specifically, the exhaust gas purification catalyst of each example was installed in the exhaust passage of an engine bench having a displacement of 4.6 L, the engine was started, and a catalyst bed temperature was held at 1000° C. for 46 hours.

(Evaluation of Exhaust Gas Purification Performance)

Figure 5:
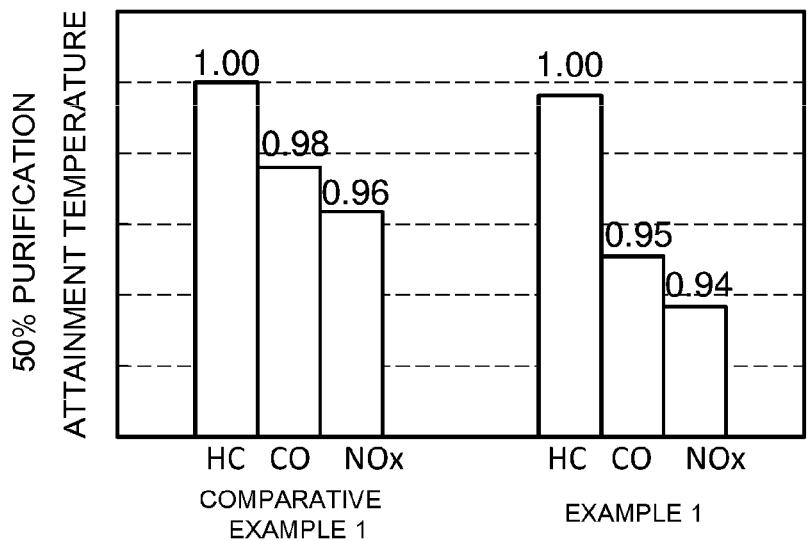
FIG. 5 is a graph of a comparison of a 50% purification attainment temperature between Comparative example 1 and Example 1.

The purification performance on exhaust gas, of the exhaust gas purification catalyst after termination of the endurance test, was evaluated. Specifically, firstly the exhaust gas purification catalyst of each example was installed in the exhaust passage of the engine bench, and the catalyst inlet gas temperature was raised from 200° C., at a rate of temperature rise of 10° C./min, using a heat exchanger. The purification rate of each component of HC, CO and $NO_x$ was measured continuously on the basis of the respective inlet gas concentration and outlet gas concentration at this time, to evaluate the catalyst inlet gas temperature (50% purification attainment temperature) at which the purification rate of each component reached 50%. The results are illustrated in FIG. 5. The values in FIG. 5 are expressed as relative values with respect to "Reference (1.00)" being herein the 50% purification attainment temperature for HC in Comparative example 1. Numerical values are herein rounded off the second decimal place. The smaller the value, the better is the purification performance denoted thereby.

As FIG. 5 illustrates, the 50% purification attainment temperatures of respective components HC, CO and $NO_x$ were all lower in Example 1 than those of Comparative example 1. The above indicates that the configuration in the art disclosed herein, i.e. a configuration where a catalyst layer is provided both in the interior of the partition wall and on the partition wall surface, at the B section, is superior in terms of exhaust gas purification.

Test Example (1)-2: Assessment of Arrangement of Catalyst Layer

Figure 6:
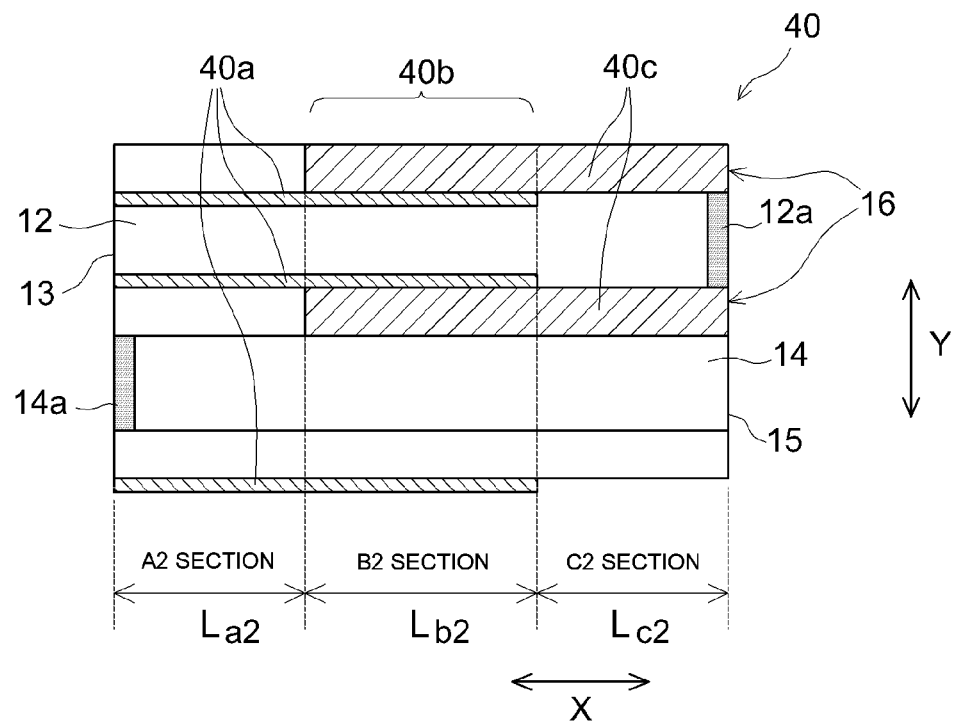
FIG. 6 is a partial cross-sectional diagram illustrating schematically an exhaust gas purification catalyst according to Comparative example 2.

An exhaust gas purification catalyst 40 having a configuration such as that illustrated in FIG. 6 was produced, as Comparative example 2. Specifically, an exhaust gas purification catalyst 40 was produced that had a catalyst layer 40a on the surface of the partition wall 16, at an A2 section, a catalyst layer 40b on the surface and in the interior of the partition wall 16, at a B2 section, and a catalyst layer 40c in the interior of the partition wall 16, at a C2 section. Specifically, firstly a Rh slurry and a Pd slurry were prepared according to Test example (1)-1. Similarly to Comparative example 1, next the prepared Pd slurry was caused to flow into the outlet cell 14 from the exhaust gas outflow end section 15, to be supplied to a portion corresponding to 70% of the total length of the partition wall 16 along the X direction, and thereby coat the interior of the partition wall 16 with the slurry, followed by drying and firing. The coating amount of the Pd slurry per volume of the substrate 11 was set to 80 g/L. Next, the prepared Rh slurry was caused to flow into the inlet cell 12 from the exhaust gas inflow end section 13, to be supplied to a portion corresponding to 70% of the total length of the partition wall 16 along the X direction, and thereby coat, with the slurry, the surface of the partition wall 16 in contact with the inlet cell 12. The coating amount of the Rh slurry per volume of the substrate 11 was set to 135 g/L. The Pd slurry in the interior of the partition wall 16 and the Rh slurry on the surface of the partition wall 16 overlapped each other over a length of 40% of the total length of the partition wall 16, at a middle portion in the X direction. The substrate 11 was dried and fired in this state. As a result, an exhaust gas purification catalyst 40 was produced, the an exhaust gas purification catalyst 40 being provided with a catalyst layer made up of the A2 section 40a (coating amount 135 g/L) having a coating width $L_{a2}$ in the X direction that was 30% of the total length of the partition wall 16, a B2 section 40b (coating amount 215 g/L) having a coating width $L_{b2}$ in the X direction that was 40% of the total length of the partition wall 16, and a C2 section 40c (coating amount 80 g/L) having a coating width $L_{c2}$ in the X direction that was 30% of the total length of the partition wall 16.

As Example 2, an exhaust gas purification catalyst was produced in the same way as in Example 1, but with modifications to the effect that the coating amounts of the Rh slurry and the Pd slurry, and the coating widths $L_a$, $L_b$, $L_c$ are identical to those of Comparative example 2. The specifications of the catalyst layers of Comparative example 2 and Example 2 are summarized in Table 2.

TABLE 2

Test example (1)-2

| Catalyst layer specifications | A section, A2 section | | | B section, B2 section | | | C section, C2 section | | |
|---|---|---|---|---|---|---|---|---|---|
| | Coating width $L_a$ (%) | Arrangement | Catalyst metal | Coating width $L_b$ (%) | Arrangement | Catalyst metal | Coating width $L_c$ (%) | Arrangement | Catalyst metal |
| Comparative example 2 | 30% | Inlet surface | Rh | 40% | Inlet surface | Rh | 30% | Interior | Pd |
| | | | | 40% | Interior | Pd | | | |

TABLE 2-continued

Test example (1)-2

| Catalyst layer specifications | A section, A2 section | | | B section, B2 section | | | C section, C2 section | | |
|---|---|---|---|---|---|---|---|---|---|
| | Coating width $L_a$ (%) | Arrangement | Catalyst metal | Coating width $L_b$ (%) | Arrangement | Catalyst metal | Coating width $L_c$ (%) | Arrangement | Catalyst metal |
| Example 2 | 30% | Interior | Rh | 40% | Inlet surface | Rh | 30% | Interior | Pd |
| | | | | 40% | Interior | Pd | | | |
| | | | | 40% | Outlet surface | Rh | | | |

Figure 7:
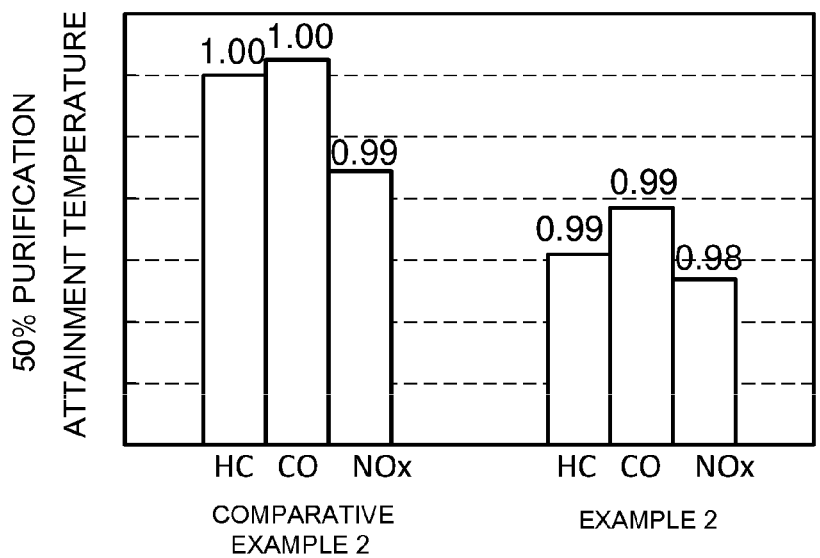
FIG. 7 is a graph of a comparison of a 50% purification attainment temperature between Comparative example 2 and Example 2.

Exhaust gas purification performance was evaluated in the same way as in Test example (1)-1. The results are illustrated in FIG. 7. The values in FIG. 7 are expressed as relative values with respect to "Reference (1.00)" being herein the 50% purification attainment temperature for HC in Comparative example 2.

As FIG. 7 illustrates, the 50% purification attainment temperatures of respective components HC, CO and $NO_x$ were all lower in Example 2 than those of Comparative example 2. This suggests that the configuration in the art disclosed herein, i.e. a configuration where a catalyst layer is provided in the interior of the partition wall, at the A section, and a catalyst layer is provided in the interior of the partition wall and both on the inlet surface and the outlet surface of the partition wall, at the B section, is superior in terms of exhaust gas purification.

Test Example (2)-1: Assessment of Length of A Section in X Direction

Figure 8:
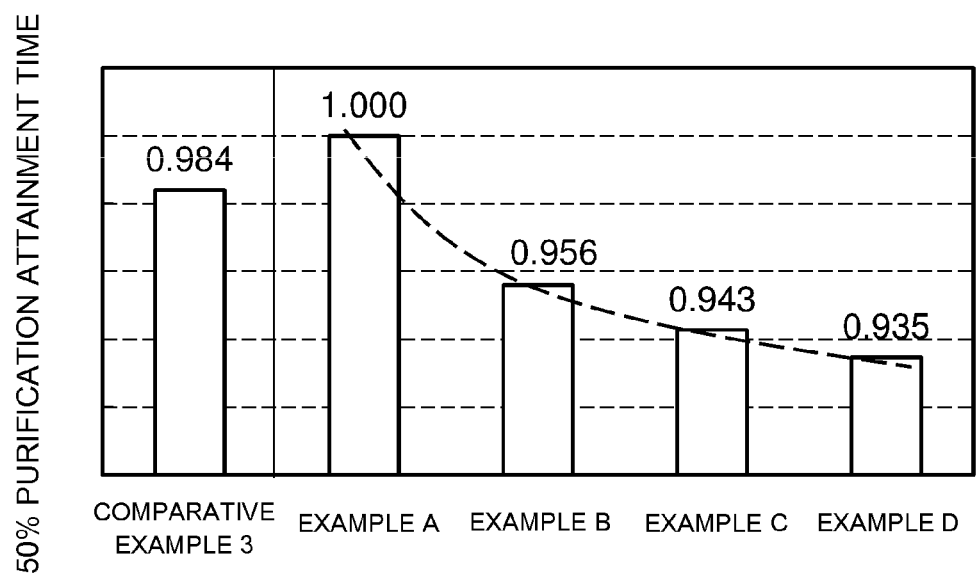
FIG. 8 is a graph of a comparison of a 50% purification attainment time between Comparative example 3 and Examples A to D.

Exhaust gas purification catalysts of Examples A to D were produced in the same way as in Example 2, but herein using a substrate 11 having a volume of 1.7 L, setting the coating amount of the Rh slurry to 100 g/L, the coating amount of the Pd slurry to 95 g/L, and modifying the coating widths $L_a$, $L_b$ and $L_c$ of the A section 20a, the B section 20b and the C section 20c in the X direction as given in Table 3. An exhaust gas purification catalyst of Comparative example 3 was produced in the same way as in Comparative example 1, but modifying herein the coating amounts of the slurries, and the coating widths $L_a$, $L_b$ and $L_c$ of the A section 20a, the B section 20b and the C section 20c in the X direction so as to be identical to those of Example C. The specifications of the catalyst layers of Comparative example 3 and Examples A to D are summarized in Table 3.

gas purification catalyst after termination of the endurance test was evaluated. Specifically, firstly the exhaust gas purification catalyst of each example was installed in the exhaust passage of an engine bench, and the catalyst inlet gas temperature was raised from 50° C. to 500° C. all at once, using a heat exchanger. The 50% purification attainment time for HC was measured on the basis of the ratio of the inlet gas concentration and the outlet gas concentration. The results are illustrated in FIG. 8. The values in FIG. 8 are expressed as relative values with respect to "Reference (1.000)" being the result of Example A. The smaller the value, the better is the warm-up property denoted thereby.

As FIG. 8 reveals that the shorter the length of the A section in the X direction, in other words, the closer the position of the beginning of the B section to the exhaust gas inflow end section, the better the warm-up property was. In terms of the warm-up property, therefore, it is found that a configuration is superior in which either of the following is satisfied: the length of the A section in the X direction is 10% to 40% of the total length of the partition wall, or, an end of the B section is at a position corresponding to 10% to 40% of the total length of the partition wall, from the exhaust gas inflow end section.

(Evaluation of Pressure Loss)

An increase rate of pressure loss of each produced exhaust gas purification catalyst was evaluated. Specifically, firstly a honeycomb substrate (reference) prior to application of the catalyst layer was prepared, and the pressure during circulation of a 7 m³/min volume of air through the substrate was measured. The pressure at the time of circulation of air was then measured, in the same way as in the reference, using each produced exhaust gas purification catalyst (honeycomb substrate with catalyst layer). A rate of increase of pressure loss (%) was calculated on the basis of the following

TABLE 3

Test example (2)-1

| Catalyst layer specifications | A section | | B section | | | C section | |
|---|---|---|---|---|---|---|---|
| | Coating width $L_a$ (%) | Catalyst metal (interior) | Coating width $L_b$ (%) | Catalyst metal (interior) | Catalyst metal (surface) | Coating width $L_c$ (%) | Catalyst metal (interior) |
| Comparative example 3 | 24 | Rh | 37 | Rh + Pd | — | 39 | Pd |
| Example A | 46 | Rh | 15 | Pd | Rh | 39 | Pd |
| Example B | 40 | | 21 | | | | |
| Example C | 24 | | 37 | | | | |
| Example D | 10 | | 51 | | | | |

(Evaluation of Warm-Up Property)

Figure 9:
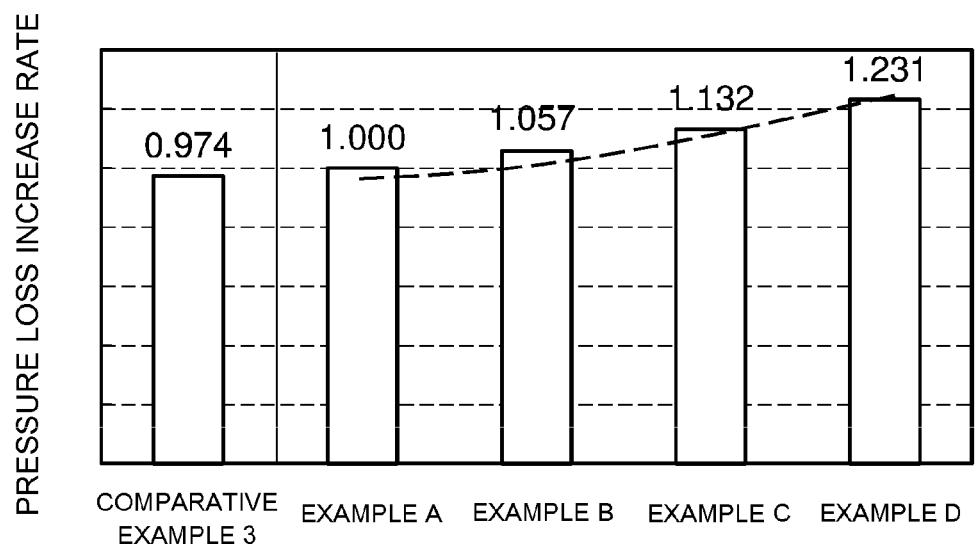
FIG. 9 is a graph of a comparison of an increase rate of pressure loss between Comparative example 3 and Examples A to D.

An endurance test similar to that of Test example (1)-1 was carried out, and the warm-up property of each exhaust expression: [(pressure of exhaust gas purification catalyst– pressure of reference)/pressure of reference]×100. The results are illustrated in FIG. 9. The values in FIG. 9 are expressed as relative values with respect to "Reference (1.000)" being the result of Example A. A smaller value entails a smaller increase in pressure loss.

As FIG. 9 illustrates, the smaller the length of the B section in the X direction, the smaller pressure loss was kept. Therefore, it is found that in terms of reducing pressure loss it is preferable that the length of the B section in the X direction be 51% or less of the total length of the partition wall.

Test Example (2)-2: Assessment of Length of B Section in X Direction

Exhaust gas purification catalysts of Examples E to I were produced in the same way as in Example C, but herein modifying the coating widths $L_a$, $L_b$ and $L_c$ of the A section 20a, the B section 20b and the C section 20c in the X direction as given in Table 4. An exhaust gas purification catalyst of Comparative example 4 was produced in the same way as in Comparative example 1, but modifying herein the coating amounts of the slurries and the coating widths $L_a$, $L_b$ and $L_c$ of the A section 20a, the B section 20b and the C section 20c in the X direction so as to be identical to those of Example G. The specifications of the catalyst layers of Comparative example 4 and Examples E to I are summarized in Table 4.

TABLE 4

Test example (2)-2

| Catalyst layer specifications | A section | | B section | | | C section | |
|---|---|---|---|---|---|---|---|
| | Coating width $L_a$ (%) | Catalyst metal (interior) | Coating width $L_b$ (%) | Catalyst metal (interior) | Catalyst metal (surface) | Coating width $L_c$ (%) | Catalyst metal (interior) |
| Comparative example 4 | 24 | Rh | 37 | Rh + Pd | — | 39 | Pd |
| Example E | 24 | Rh | 15 | Pd | Rh | 61 | Pd |
| Example F | | | 26 | | | 50 | |
| Example G | | | 37 | | | 39 | |
| Example H | | | 48 | | | 28 | |
| Example I | | | 56 | | | 20 | |

Figure 10:
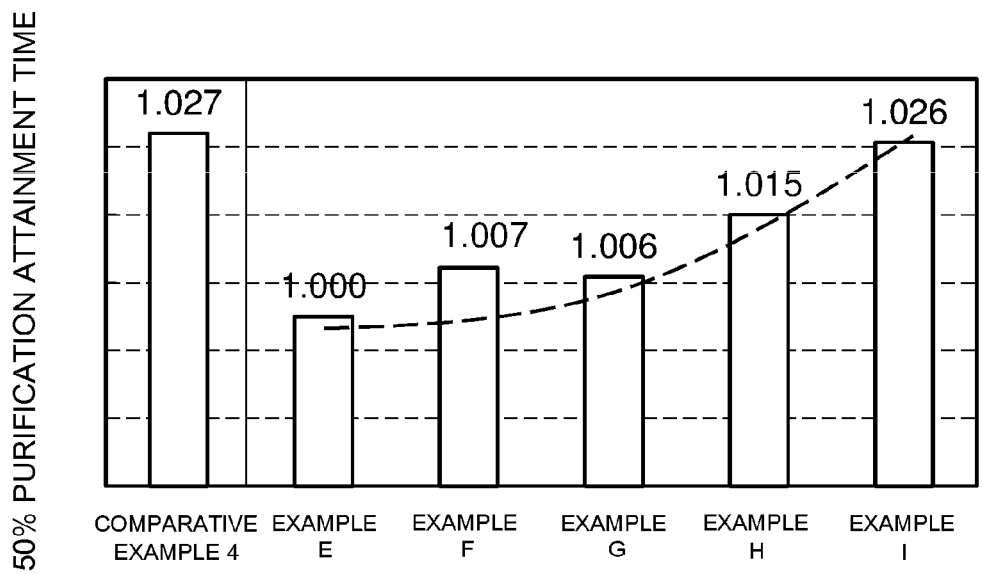
FIG. 10 is a graph of a comparison of a 50% purification attainment time between Comparative example 4 and Examples E to I.
Figure 11:
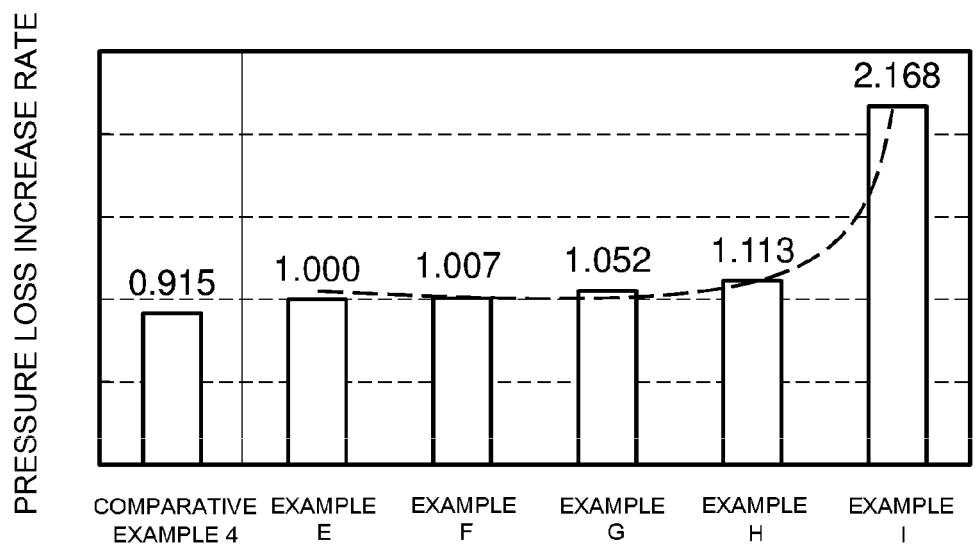
FIG. 11 is a graph of a comparison of an increase rate of pressure loss between Comparative example 4 and Examples E to I.

The warm-up property and pressure loss were evaluated as in Test example (2)-1. The results are illustrated in FIG. 10 and FIG. 11. The values in FIG. 10 and FIG. 11 are expressed as relative values with respect to "Reference (1.000)" being the result of Example E.

As FIG. 10 illustrates, the warm-up property was good when the length of the B section in the X direction lay in a predetermined range, in other words, when (length of the A section in the X direction+length of the C section in the X direction) lay in a predetermined range. Although the underlying reasons are unclear, it is found that herein the inflow amount of exhaust gas in the extension direction of the partition wall is less biased, which allows the entirety of the catalyst layer to be utilized effectively. As FIG. 11 illustrates, pressure loss rose sharply when the length of the B section in the X direction was 56% of the total length of the partition wall. In terms of enhancing the warm-up property and reduce pressure loss, therefore, it is found that a configuration is superior in which either of the following is satisfied: the length of the B section in the X direction is 15% to 51% (more preferably 15% to 40%) of the total length of the partition wall, or, (length of the A section in the X direction+length of the C section in the X direction) is 49% to 85% (more preferably 60% to 85%) of the total length of the partition wall.

Test Example (2)-3: Assessment of Coating Amount in B Section

Exhaust gas purification catalysts of Examples J to M were produced in the same way as in Example G, but modifying the coating amounts in the A section 20a, the B section 20b and the C section 20c as given in Table 5. An exhaust gas purification catalyst of Comparative example 5 was produced in the same way as in Comparative example 1, but modifying herein the coating amounts of the slurries, and the coating widths $L_a$, $L_b$ and $L_c$ of the A section 20a, the B section 20b and the C section 20c in the X direction so as to be identical to those of Example L. The specifications of the catalyst layers of Comparative example 5 and Examples J to M are summarized in Table 5.

TABLE 5

Test example (2)-3

| Catalyst layer specifications | A section | | B section | | | C section | |
|---|---|---|---|---|---|---|---|
| | Coating amount (g/L) | Catalyst metal (interior) | Coating amount (g/L) | Catalyst metal (interior) | Catalyst metal (surface) | Coating amount (g/L) | Catalyst metal (interior) |
| Comparative example 5 | 95 | Rh | 215 | Rh + Pd | — | 120 | Pd |
| Example J | 95 | Rh | 145 | Pd | Rh | 50 | Pd |
| Example K | | | 165 | | | 70 | |

TABLE 5-continued

Test example (2)-3

| Catalyst layer specifications | A section Coating amount (g/L) | A section Catalyst metal (interior) | B section Coating amount (g/L) | B section Catalyst metal (interior) | B section Catalyst metal (surface) | C section Coating amount (g/L) | C section Catalyst metal (interior) |
|---|---|---|---|---|---|---|---|
| Example L |  |  | 215 |  |  | 120 |  |
| Example M |  |  | 235 |  |  | 140 |  |

Figure 12:
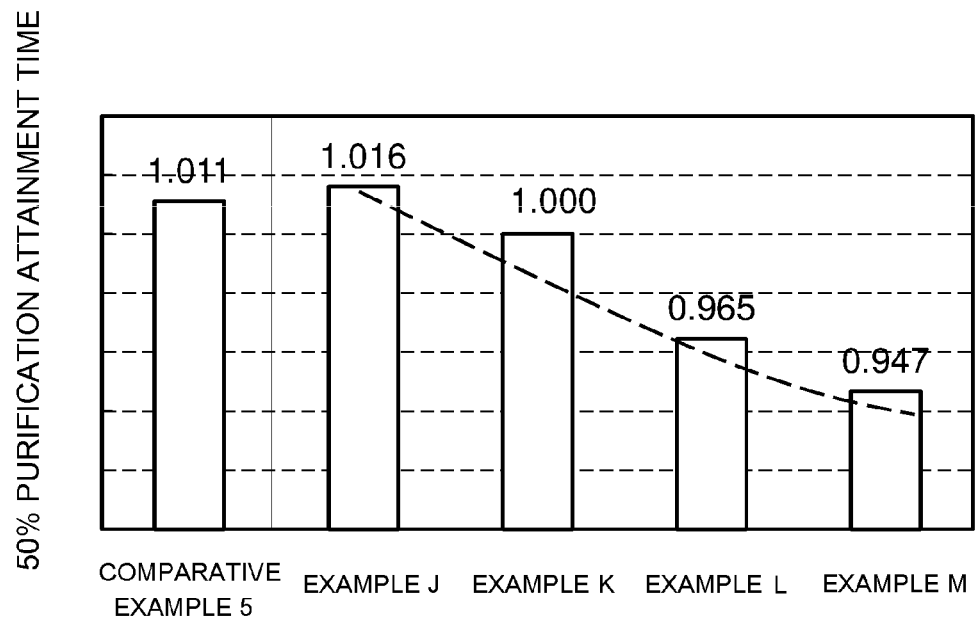
FIG. 12 is a graph of a comparison of a 50% purification attainment time between Comparative example 5 and Examples J to M.

The warm-up property and pressure loss were evaluated as in Test example (2)-1. The results are illustrated in FIG. 12. The values in FIG. 12 are expressed as relative values with respect to "Reference (1.000)" being the result of Example K. As FIG. 12 illustrates, the greater the coating amount in the B section, the better the warm-up property was. In terms of the warm-up property, therefore, it is found that the coating amount in the B section is preferably 145 g/L or more, for instance 165 g/L or more. In the substrate 11 used herein, slurry in the C section might in some instances jut from the interior of the partition wall when the coating amount in the C section exceeded 140 g/L. Therefore, the upper limit of the coating amount in the A section and the C section needs to be established on the basis of the properties of the substrate.

Test Example (2)-4: Assessment 1 of Coating Amount in A Section

Exhaust gas purification catalysts of Examples N to R were produced in the same way as in Example G, but modifying the coating amounts in the A section 20a, the B section 20b and the C section 20c as given in Table 6. An exhaust gas purification catalyst of Comparative example 6 was produced in the same way as in Comparative example 1, but modifying the coating amounts of the slurries as given in Table 6, and modifying the coating widths $L_a$, $L_b$ and $L_c$ of the A section 20a, the B section 20b and the C section 20c in the X direction so as to be identical to those of Example G. The specifications of the catalyst layers of Comparative example 6 and Examples N to R are summarized in Table 6.

Figure 13:
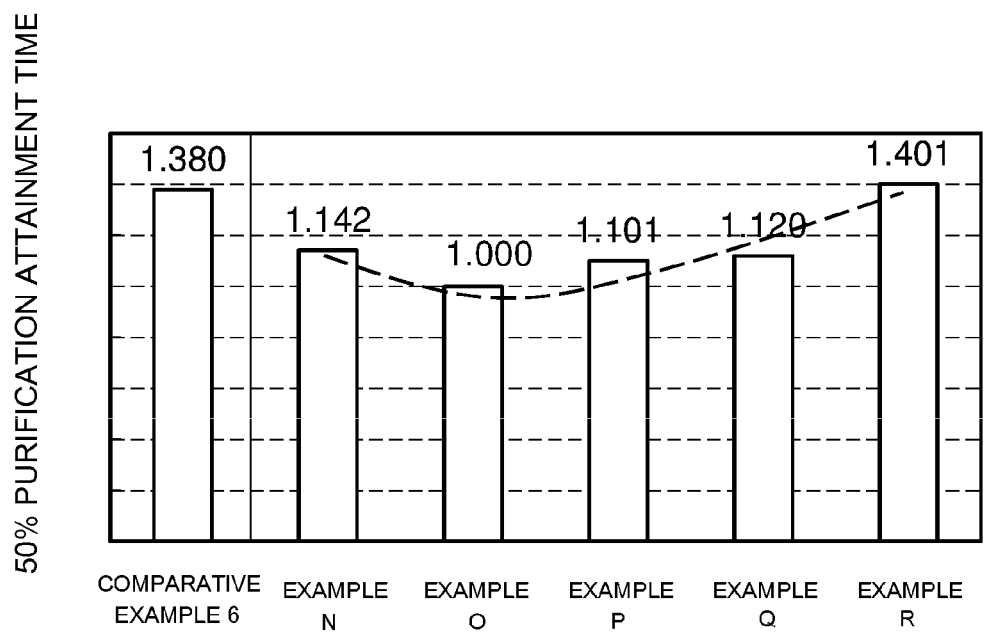
FIG. 13 is a graph of a comparison of a 50% purification attainment time between Comparative example 6 and Examples N to R.

The warm-up property and pressure loss were evaluated as in Test example (2)-1. The results are illustrated in FIG. 13. The values in FIG. 13 are expressed as relative values with respect to "Reference (1.000)" being the result of Example O. As FIG. 13 illustrates, the warm-up property was good when the coating amount in the A section lay in a predetermined range, and/or the coating amount in the C section was larger than the coating amount in the A section. In terms of the warm-up property, therefore, it is found that it is preferable that the coating amount in the A section be 45 to 100 g/L, and/or the coating amount in the C section be larger than the coating amount in the A section. In the substrate 11 used herein, the slurry might in some instances collect within the partition wall and fail to be deposited on the surface of the partition wall, in the B section, when the coating amount in the B section was smaller than 145 g/L. Therefore, the lower limit of the coating amounts in the B section needs to be established on the basis of the properties of the substrate.

Test Example (3): Assessment 1 of Metal Species of Catalyst

Exhaust gas purification catalysts of Examples S and T were produced in the same way as in Example G, but herein setting the coating amount of the Rh slurry to 95 g/L, the coating amount of the Pd slurry to 120 g/L, and modifying the metal catalyst as given in Table 7. The specifications of the catalyst layers of Examples S and T are summarized in Table 7.

TABLE 6

Test example (2)-4

| Catalyst layer specifications | A section Coating amount (g/L) | A section Catalyst metal (interior) | B section Coating amount (g/L) | B section Catalyst metal (interior) | B section Catalyst metal (surface) | C section Coating amount (g/L) | C section Catalyst metal (interior) |
|---|---|---|---|---|---|---|---|
| Comparative example 6 | 95 | Rh | 195 | Rh + Pd | — | 100 | Pd |
| Example N | 45 | Rh | 145 | Pd | Rh | 100 | Pd |
| Example O | 70 |  | 170 |  |  |  |  |
| Example P | 85 |  | 185 |  |  |  |  |
| Example Q | 100 |  | 200 |  |  |  |  |
| Example R | 120 |  | 220 |  |  |  |  |

TABLE 7

Test example (3)

| Catalyst layer specifications | A section | | B section | | | C section | |
|---|---|---|---|---|---|---|---|
| | Coating width $L_a$ (%) | Catalyst metal (interior) | Coating width $L_b$ (%) | Catalyst metal (interior) | Catalyst metal (surface) | Coating width $L_c$ (%) | Catalyst metal (interior) |
| Example S | 24 | Pd | 37 | Pd | Rh | 39 | Rh |
| Example T | | Rh | | Pd | Rh | | Pd |

(Evaluation of Exhaust Gas Purification Performance at High Load)

An endurance test similar to that of Test example (1)-1 above was carried out, and the exhaust gas purification performance at high load of each exhaust gas purification catalyst after termination of the endurance test was evaluated. Specifically, the exhaust gas purification catalyst of each example was firstly disposed in the exhaust passage of an automobile with a turbocharger having a displacement of 2.0 L. The automobile ran next according to a WLTC (World-wide harmonized Light duty Test Cycle), and emissions (mg/mile) of respective components HC, CO, $NO_x$ in a high-load region (Ex-H, Phase 4) were measured.

The results are given in Table 8. The values in Table 8 are expressed as relative values with respect to "Reference (1.000)" being the result of Example S. As Table 8 reveals, a high purification performance at high load was obtained by providing Rh at the C section in the vicinity of the exhaust gas outflow end section. A conceivable reason for this is that at high load the exhaust gas flows readily through the C section and opportunities for contact between exhaust gas and Rh increase. Therefore, it is deemed that a configuration where Rh is provided in the C section is preferable when purification performance at high load is to be emphasized.

The warm-up property was evaluated as in Test example (2)-1. The results are given in Table 8. The values in Table 8 are expressed as relative values with respect to "Reference (1.000)" being the result of Example T. Table 8 reveals that an effect of enhancing the warm-up property is elicited by providing Pd in the A section, in the vicinity of the exhaust gas inflow end section. It is deemed that a conceivable reason for this is that purification reactions of HC and CO take place at the exhaust gas inflow end section when exhaust gas at a temperature lower than the catalytic activity temperature flows in, whereupon the entire catalyst body is activated on account of the reaction heat generated in these purification reactions. Therefore, it is deemed that a configuration where Pd is provided in the A section is preferable when the warm-up property is to be emphasized.

Exhaust gas purification performance was evaluated in the same way as in Test example (1)-1. The results are given in Table 8. The values in Table 8 are expressed as relative values with respect to "Reference (1.00)" being herein the 50% purification attainment temperature for HC in Example S. As Table 8 reveals, high purification performance at low to medium loads was obtained by providing Rh in the A section in the vicinity of the exhaust gas inflow end section. A conceivable reason for this is that at low to medium loads the exhaust gas flows readily through the A section and opportunities for contact between exhaust gas and Rh are more numerous. It is therefore found that a configuration where Rh is provided in the A section is preferable when ordinary purification performance is to be emphasized.

TABLE 8

Evaluation results of Test example (3)

| | High load Phase 4 | Warm-up property 50% purification attainment time | Normally (low to medium load) 50% purification attainment temperature | | |
|---|---|---|---|---|---|
| | $NO_x$ purification rate | HC | HC | CO | $NO_x$ |
| Example S | 1.000 | 0.961 | 1.000 | 0.998 | 0.987 |
| Example T | 0.730 | 1.000 | 0.971 | 0.968 | 0.956 |

Test Example (4): Assessment 2 of Metal Species of Catalyst

Exhaust gas purification catalysts of Examples U and V were produced in the same way as in Example G, but setting herein the coating amount of the Rh slurry to 95 g/L, the coating amount of the Pd slurry to 120 g/L, and modifying the metal catalyst as given in Table 9.

TABLE 9

Test example (4)

| Catalyst layer specifications | A section | | B section | | | C section | |
|---|---|---|---|---|---|---|---|
| | Coating width $L_a$ (%) | Catalyst metal (interior) | Coating width $L_b$ (%) | Catalyst metal (interior) | Catalyst metal (surface) | Coating width $L_c$ (%) | Catalyst metal (interior) |
| Example U | 24 | Rh | 37 | Rh | Pd | 39 | Pd |
| Example V | | Rh | | Pd | Rh | | Pd |

Exhaust gas purification performance was evaluated in the same way as in Test example (1)-1. The results are given in Table 10. The values in Table 10 are expressed as relative values with respect to "Reference (1.000)" being herein the 50% purification attainment temperature for HC in Example U. As Table 10 reveals, a high purification performance at low to medium loads was obtained by providing Rh on the partition wall surface at the B section. A conceivable reason for this is that at low to medium loads the exhaust gas spreads readily within the inlet cell or the outlet cell, through gas diffusion, and opportunities for contact between exhaust gas and Rh increase. It is therefore found that a configuration where Rh is provided on the partition wall surface of the B section is preferable when ordinary purification performance is to be emphasized.

TABLE 10

Evaluation results of Test example (4)

| | Normal 50% purification attainment temperature | | |
|---|---|---|---|
| | HC | CO | $NO_x$ |
| Example U | 1.000 | 1.001 | 0.993 |
| Example V | 0.980 | 0.977 | 0.965 |

Test Example (5): Assessment 2 of Coating Amount in A Section

Exhaust gas purification catalysts of Examples W and X were produced in the same way as in Example G, but modifying the coating amounts in the A section 20a, the B section 20b and the C section 20c as given in Table 11.

TABLE 11

Test example (5)

| | A section | | B section | | C section | |
|---|---|---|---|---|---|---|
| Catalyst layer specifications | Coating amount (g/L) | Coating width $L_a$ (%) | Coating amount (g/L) | Coating width $L_b$ (%) | Coating amount (g/L) | Coating width $L_c$ (%) |
| Example W | 95 | 24 | 235 | 37 | 140 | 39 |
| Example X | 140 | 39 | | | 95 | 24 |

Pressure loss was evaluated as in Test example (2)-1. The results are given in Table 12. The values in Table 12 are expressed as relative values with respect to "Reference (1.000)" being the result of Example W. As Table 12 reveals, pressure loss was relatively low when the coating amount in the C section was smaller than that in the A section. Therefore, it is found that the coating amount in the C section is preferably smaller than the coating amount in the A section, in terms of reducing pressure loss.

TABLE 12

Evaluation results of Test example (5)

| | Pressure loss increase rate |
|---|---|
| Example W | 1.000 |
| Example X | 0.974 |

Concrete examples of the invention have been explained in detail above, but these examples are merely illustrative in nature, and are not meant to limit the scope of the claims.

The art set forth in the claims encompasses various alterations and modifications of the concrete examples illustrated above.

In the embodiments described above the exhaust gas purification catalyst was the GPF 10, but the exhaust gas purification catalyst is not limited thereto. In a case for instance where the internal combustion engine 2 is a diesel engine, the exhaust gas purification catalyst may be a diesel particulate filter (DPF).

REFERENCE SIGNS LIST

1 Exhaust gas purification device
2 Internal combustion engine
10 GPF (exhaust gas purification catalyst)
11 Substrate
12 Inlet cell
14 Outlet cell
16 Partition wall
20 Catalyst layer

The invention claimed is:

1. An exhaust gas purification catalyst which is disposed in an exhaust passage of an internal combustion engine and which purifies exhaust gas emitted by the internal combustion engine, the exhaust gas purification catalyst comprising:
a substrate having a wall-flow structure including an inlet cell in which an exhaust gas inflow end section opens, an outlet cell in which an exhaust gas outflow end section opens, and a porous partition wall that separates the inlet cell from the outlet cell; and
a catalyst layer provided in the substrate, and which contains a noble metal catalyst,
wherein the catalyst layer includes:
an A section provided in the interior of the partition wall along the extension direction of the partition wall from the exhaust gas inflow end section;
a C section provided in the interior of the partition wall along the extension direction of the partition wall from the exhaust gas outflow end section; and
a B section disposed between the A section and the C section in the extension direction of the partition wall, the B section being provided over the surface of the partition wall on the side in contact with the inlet cell, the interior of the partition wall, and the surface of the partition wall on the side in contact with the outlet cell.

2. The exhaust gas purification catalyst according to claim 1, wherein relative to the total length of the partition wall in the extension direction as 100%,
the B section is disposed over a length of 15% to 51% of the total length of the partition wall.

3. The exhaust gas purification catalyst according to claim 1, wherein
relative to the total length of the partition wall in the extension direction as 100%, the A section is disposed over a length of 10% to 40% of the total length of the partition wall.

4. The exhaust gas purification catalyst according to claim 1, wherein
a coating amount on the B section per L of volume of the substrate is 145 g/L or more.

5. The exhaust gas purification catalyst according to claim 1, wherein
the coating amount on the C section per L of volume of the substrate is larger than the coating amount on the A section per L of volume of the substrate.

6. The exhaust gas purification catalyst according to claim 1, wherein
the coating amount on the C section per L of volume of the substrate is smaller than the coating amount on the A section per L of volume of the substrate.

7. The exhaust gas purification catalyst according to claim 1, wherein
the A section contains rhodium.

8. The exhaust gas purification catalyst according to claim 1, wherein
the B section contains rhodium, on the surface of the partition wall on the side in contact with the inlet cell.

9. The exhaust gas purification catalyst according to claim 1, wherein
the C section contains rhodium.

10. The exhaust gas purification catalyst according to claim 1, wherein
the A section contains palladium.

11. The exhaust gas purification catalyst according to claim 1, wherein
the internal combustion engine is a gasoline engine.

\* \* \* \* \*